United States Patent
Amin et al.

(10) Patent No.: US 10,978,947 B2
(45) Date of Patent: Apr. 13, 2021

(54) SINGLE-INDUCTOR MULTIPLE-OUTPUT (SIMO) POWER CONVERTER WITH A CROSS-REGULATION SWITCH

(71) Applicant: Qualcomm Incorporated, San Diego, CA (US)

(72) Inventors: Sally Amin, La Jolla, CA (US); Lin Xue, San Diego, CA (US); Iulian Mirea, San Diego, CA (US); Song Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/384,446

(22) Filed: Apr. 15, 2019

(65) Prior Publication Data

US 2020/0328677 A1   Oct. 15, 2020

(51) Int. Cl.
  *H02M 3/155*   (2006.01)
  *H02M 1/00*   (2006.01)

(52) U.S. Cl.
  CPC .............. *H02M 3/155* (2013.01); *H02M 1/00* (2013.01); *H02M 2001/0048* (2013.01)

(58) Field of Classification Search
  CPC ...... H02M 3/156; H02M 3/157; H02M 3/158; H02M 3/1582; H02M 3/1584; H02M 3/1588; H02M 2001/0067; H02M 2001/007; H02M 2001/008; H02M 2001/009; H02M 3/285; H02M 3/33561; H02M 3/3353; H02J 1/10
  See application file for complete search history.

(56) References Cited

U.S. PATENT DOCUMENTS

| | | | |
|---|---|---|---|
| 7,061,214 B2* | 6/2006 | Mayega | H02M 3/155 323/267 |
| 8,427,121 B2* | 4/2013 | Notman | H02M 3/1588 323/267 |

(Continued)

FOREIGN PATENT DOCUMENTS

| | | |
|---|---|---|
| GB | 2484012 A | 3/2012 |
| KR | 101737263 B1 | 5/2017 |

OTHER PUBLICATIONS

Huang, et al., "Single-Inductor Multi-Output (SIMO) DC-DC Converters With High Light-Load Efficiency and Minimized Cross-Regulation for Portable Devices", IEEE Journal of Solid-State Circuits, vol. 44, No. 4, Apr. 2009, Apr. 2009, 13.

(Continued)

*Primary Examiner* — An T Luu
(74) *Attorney, Agent, or Firm* — Colby Nipper

(57) ABSTRACT

An apparatus is disclosed for a single-inductor multiple-output (SIMO) power converter with a cross-regulation switch. An example apparatus includes a power source and a SIMO power converter. The SIMO power converter includes an input node coupled to the power source, a first node, a second node, a ground node, and an inductor coupled between the first node and the second node. The single-inductor multiple-output power converter also includes a first switch coupled between the input node and the first node, a second switch coupled between the first node and the ground node, and a cross-regulation switch coupled between the input node and the second node.

30 Claims, 9 Drawing Sheets

(56) References Cited

U.S. PATENT DOCUMENTS 9,065,334 B2 * 6/2015 Kuan .................... H02M 3/158
10,291,117 B2 * 5/2019 Petersen ............... H02M 3/156

OTHER PUBLICATIONS

Ma, et al., "A Pseudo-CCM/DCM SIMO Switching Converter With Freewheel Switching", IEEE Journal of Solid-State Circuits, vol. 38, No. 6, Jun. 2003, Jun. 2003, 8 pages.
Patra, et al., "Control Scheme for Reduced Cross-Regulation in Single-Inductor Multiple-Output DC-DC Converters", IEEE Transactions on Industrial Electronics, vol. 60, No. 11, Nov. 2013, Nov. 2013, 10 pages.
Solis, et al., "Nested Hysteretic Current-mode Single-inductor Multiple-output (SIMO) Boosting Buck Converter", Georgia Institute of Technology, Atlanta, Georgia 30332 U.S.A. 978-1-4799-0620-8/13 © 2013 IEEE, 2013, 4 pages.
International Search Report and Written Opinion—PCT/US2020/027527—ISAEPO—dated Jul. 16, 2020.
Kuan C-W., et al., "Near-Independently Regulated 5-Output Single-Inductor DC-DC Buck Converter Delivering 1.2W/mm2 in 65nm CMOS", Solid-State Circuits Conference Digest of Technical Papers (ISSCC), 2012 IEEE International, IEEE, Feb. 19, 2012 (Feb. 19, 2012), pp. 274-276, XP032154466, DOI: 10.1109/ISSCC.2012.6177013, ISBN: 978-1-4673-0376-7, figures 16.1.1-16.1.3, p. 274.

* cited by examiner

SINGLE-INDUCTOR MULTIPLE-OUTPUT (SIMO) POWER CONVERTER WITH A CROSS-REGULATION SWITCH

TECHNICAL FIELD

This disclosure relates generally to power converters and, more specifically, to a single-inductor multiple-output power converter employing a cross-regulation switch to improve cross-regulation performance.

BACKGROUND

Electronic devices use power converters to transfer power from a power source to one or more components (e.g., loads) within the electronic device. Some types of power converters use a single-inductor multiple-output (SIMO) architecture. By using a single inductor, the SIMO power converter can have a relatively small size compared to other types of power converters that utilize multiple inductors. This enables the SIMO power converter to fit within space-constrained devices.

SUMMARY

Figure 1:
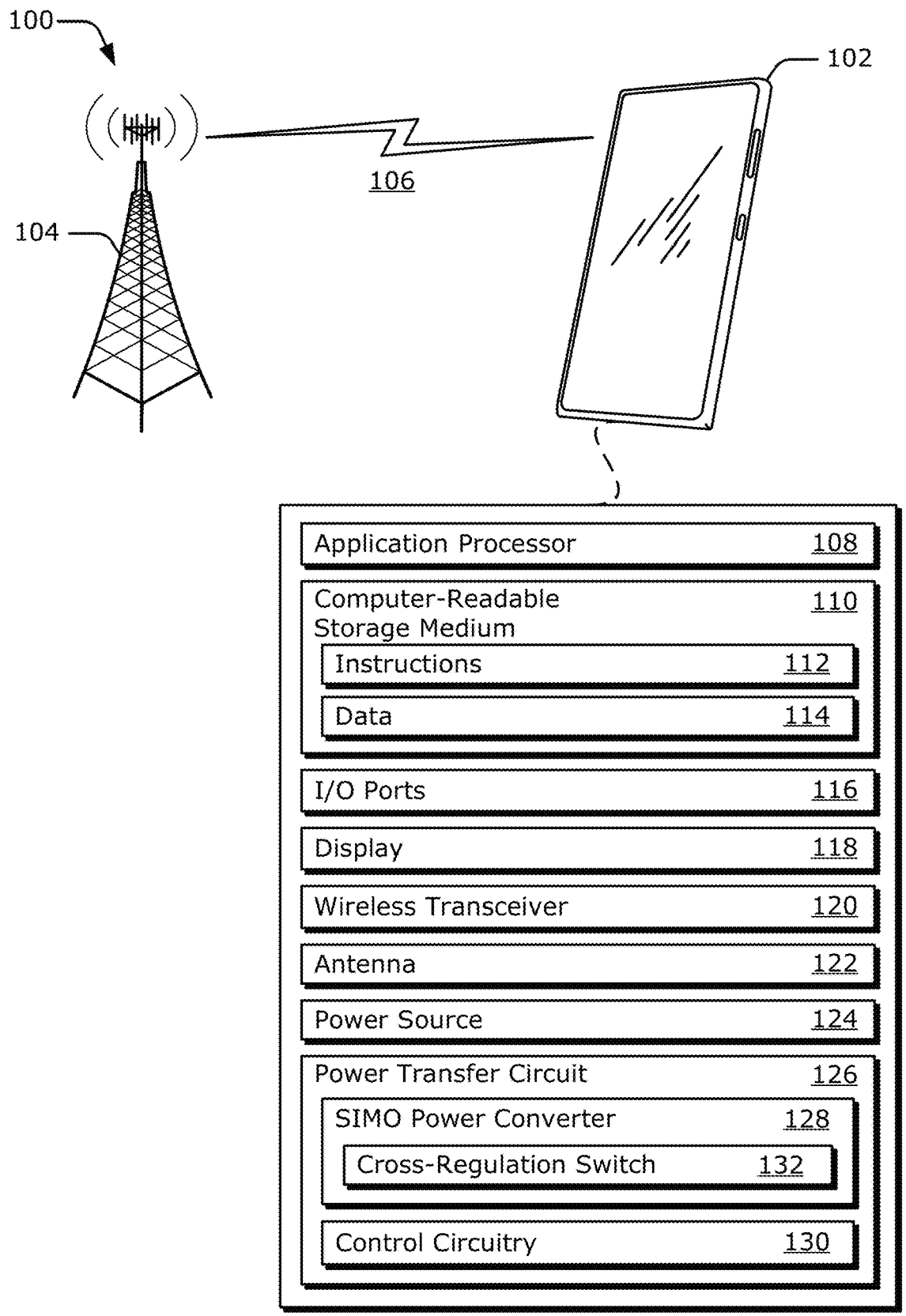
FIG. 1 illustrates an example operating environment using a single-inductor multiple-output (SIMO) power converter with a cross-regulation switch.

An apparatus is disclosed that implements a single-inductor multiple-output (SIMO) power converter with a cross-regulation switch. In particular, the SIMO power converter includes an input node, a first node, a second node, a ground node, and an inductor coupled between the first node and the second node. The SIMO power converter also includes multiple switches, such as a first switch coupled between the input node and the first node, a second switch coupled between the first node and the ground node, and a cross-regulation switch coupled between the input node and the second node. During a first time interval, operational states of the above switches are in accordance with a first switch configuration, which enables the SIMO power converter to operate as a buck converter, a boost converter, or a buck-boost converter, and so forth to transfer power from a power source to at least two loads.

In response to a cross-regulation event (e.g., a load-step event or a reference-step event) associated with one or more of the loads, the operational states of the above switches are changed to a second switch configuration, which enables the SIMO power converter to provide a transfer energy from the inductor to the power source. Consequently, cross-regulation problems are mitigated by directing at least a portion of the energy that is stored within the inductor back to the power source, which reduces a percentage of overshoot or undershoot experienced at the loads relative to other power converters that do not operate the above switches in the second switch configuration. Furthermore, control circuitry that regulates current through the inductor can dynamically adjust the current based on the additional energy that is fed back to the power source. In particular, the control circuitry utilizes an averaged cross-regulation control signal associated with the cross-regulation switch to desensitize a loop bandwidth of the control circuitry from current sensing resistance and to reduce undershoot and/or overshoot in a transient response of the power transfer circuit without significantly degrading efficiency performance. In this way, described implementations of the SIMO power converter use the cross-regulation switch to improve cross-regulation performance.

In an example aspect, an apparatus is disclosed with a single-inductor multiple-output power converter. The apparatus includes a power source and the single-inductor multiple-output power converter. The single-inductor multiple-output power converter includes an input node coupled to the power source, a first node, a second node, a ground node, and an inductor coupled between the first node and the second node. The single-inductor multiple-output power converter also includes a first switch coupled between the input node and the first node, a second switch coupled between the first node and the ground node, and a cross-regulation switch coupled between the input node and the second node.

In an example aspect, an apparatus with a single-inductor multiple-output power converter is disclosed. The apparatus includes a power source, at least two loads, and the single-inductor multiple-output power converter. The single-inductor multiple-output power converter includes an input node coupled to the power source, at least two output nodes respectively coupled to the at least two loads, and an inductor coupled between the input node and the at least two output nodes. The single-inductor multiple-output power converter also includes power-delivery means for selectively charging and discharging the inductor to transfer power from the power source to one of the at least two loads and discharging the inductor to transfer energy from the inductor to the power source. The power-delivery means is coupled to the input node, the inductor, and the at least two output nodes.

In an example aspect, a method of operating a single-inductor multiple-output power converter with a cross-regulation switch is disclosed. The method includes disconnecting an input node of the single-inductor multiple-output power converter from a first node of the single-inductor multiple-output power converter. The single-inductor multiple-output power converter includes a second node, a ground node, and an inductor coupled between the first node and the second node. The method also includes connecting the first node to the ground node. The method further includes connecting the input node to the second node to transfer energy from the inductor to a power source coupled to the input node.

In an example aspect, an apparatus with a single-inductor multiple-output power converter is disclosed. The apparatus includes a power source, at least two loads, and the single-inductor multiple-output power converter. The single-inductor multiple-output power converter includes an input node coupled to the power source, at least two output nodes respectively coupled to the at least two loads, an inductor coupled between the input node and the at least two output nodes, a node disposed between the inductor and the at least two output nodes, and a cross-regulation switch coupled between the input node and the node. The single-inductor multiple-output power converter is configured to discharge the inductor to transfer energy from the inductor to the power source via the cross-regulation switch.

DETAILED DESCRIPTION

Electronic devices use power converters to transfer power from a power source to one or more components (e.g., loads) within the electronic device. Some types of power converters use a single-inductor multiple-output (SIMO) architecture. By using a single inductor, the SIMO power converter can have a relatively small size compared to other types of power converters that utilize multiple inductors. This enables the SIMO power converter to fit within space-constrained devices. However, because the single inductor is shared by multiple loads, cross-regulation problems can occur in which a change associated with power delivery to a first load affects the power delivery to a second load. For example, a load-step event that increases or decreases a first load current provided to the first load can result in an overshoot and/or undershoot of an output voltage provided to the second load. As another example, a reference-step event that causes a first output voltage for the first load to increase can also result in an overshoot and/or undershoot of a second output voltage provided to the second load. Although it can be advantageous to utilize a SIMO power converter for its small form factor and efficiency, performance of the SIMO power converter may be limited by the cross-regulation problems.

Some techniques improve cross-regulation performance of a SIMO power converter by operating the SIMO power converter in a pseudo-continuous conduction mode (PCCM). Between each power-delivery cycle, a freewheel switch is closed to store charge of an inductor and maintain a fixed current through the inductor. This freewheeling cycle, however, reduces an efficiency of the SIMO power converter.

In contrast, techniques implementing a SIMO power converter with a cross-regulation switch are described herein. In particular, the SIMO power converter includes an input node, a first node, a second node, a ground node, and an inductor coupled between the first node and the second node. The SIMO power converter also includes multiple switches, such as a first switch coupled between the input node and the first node, a second switch coupled between the first node and the ground node, and a cross-regulation switch coupled between the input node and the second node. During a first time interval, operational states of the above switches are in accordance with a first switch configuration, which enables the SIMO power converter to operate as a buck converter, a boost converter, or a buck-boost converter, and so forth to transfer power from a power source to at least two loads.

In response to a cross-regulation event (e.g., a load-step event or a reference-step event) associated with one or more of the loads, the operational states of the above switches are changed to a second switch configuration, which enables the SIMO power converter to provide a transfer energy from the inductor to the power source. Consequently, cross-regulation problems are mitigated by directing at least a portion of the energy that is stored within the inductor back to the power source, which reduces a percentage of overshoot or undershoot experienced at the loads relative to other power converters that do not operate the above switches in the second switch configuration. By actively monitoring for the cross-regulation event and dynamically adjusting the switch configurations accordingly, the SIMO power converter 128 can realize improved cross-regulation performance without significantly degrading efficiency. Furthermore, control circuitry that regulates current through the inductor can dynamically adjust the current based on the additional energy that is fed back to the power source. In particular, the control circuitry utilizes an averaged cross-regulation control signal to desensitize a loop bandwidth of the control circuitry from current sensing resistance and to reduce undershoot and/or overshoot in a transient response of the power transfer circuit without significantly degrading efficiency performance. In this way, described implementations of the SIMO power converter use the cross-regulation switch to improve cross-regulation performance.

FIG. 1 illustrates an example environment 100 for a SIMO power converter with a cross-regulation switch. In the environment 100, a computing device 102 communicates with a base station 104 through a wireless communication link 106 (wireless link 106). In this example, the computing device 102 is depicted as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, wearable computer, server, network-attached storage (NAS) device, smart appliance or other internet of things (IoT) device, medical device, vehicle-based communication system, radar, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, server device, terrestrial television broadcast tower, access point, peer-to-peer device, mesh network node, and so forth. Therefore, the computing device 102 may communicate with the base station 104 or another device via the wireless link 106.

The wireless link 106 can include a downlink of data or control information communicated from the base station 104 to the computing device 102, or an uplink of other data or control information communicated from the computing device 102 to the base station 104. The wireless link 106 may be implemented using any suitable communication protocol or standard, such as second-generation (2G), third-generation (3G), fourth-generation (4G), or fifth-generation (5G) cellular; IEEE 802.11 (e.g., Wi-Fi™); IEEE 802.15 (e.g., Bluetooth™); IEEE 802.16 (e.g., WiMAX™); and so forth. In some implementations, the wireless link 106 wirelessly provides power and the base station 104 comprises a power source.

As shown, the computing device 102 includes an application processor 108 and a computer-readable storage medium 110 (CRM 110). The application processor 108 may include any type of processor, such as a multi-core processor, that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Alternately or additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna 122. Components of the wireless transceiver 120 can include amplifiers, switches, mixers, analog-to-digital converters, filters, and so forth for conditioning the communication signals (e.g., for generating or processing signals). The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate receiver and transmitter entities. Additionally or alternatively, the wireless transceiver 120 can be realized using multiple or different sections to implement respective receiving and transmitting operations (e.g., separate transmit and receive chains). In general, the wireless transceiver 120 processes data and/or signals associated with communicating data of the computing device 102 over the antenna 122.

The computing device 102 also includes a power source 124 and a power transfer circuit 126. The power source 124 can represent a variety of different types of power sources, including a wired power source, a solar charger, a portable charging station, a wireless charger, a battery, and so forth. Depending on the type of computing device 102, the battery may comprise a lithium-ion battery, a lithium polymer battery, a nickel-metal hydride battery, a nickel-cadmium battery, a lead acid battery, and so forth. In some cases, the battery can include multiple batteries, such as a main battery and a supplemental battery, and/or multiple battery cell combinations.

The power transfer circuit 126 transfers power from the power source 124 to one or more loads of the computing device 102 (not shown in FIG. 1). Generally, the power level provided via the power transfer circuit 126 and the power source 124 is at a level sufficient to power the one or more loads. For example, the power level may be on the order of milliwatts (mW) for powering loads associated with a smart phone, or on the order of watts to kilowatts (kW) for powering loads associated with an electric vehicle. Example types of loads include a variable load, a load associated with a component of the computing device 102 (e.g., the application processor 108 or an amplifier within the wireless transceiver 120), another power converter, another battery, and so forth. The power transfer circuit 126 can be a stand-alone component or integrated within another component, such as a power-management integrated circuit (PMIC) (not shown).

The power transfer circuit 126 includes a SIMO power converter 128 and control circuitry 130. The SIMO power converter 128 can be implemented as a buck power converter, a boost power converter, a buck-boost power converter, and so forth. The SIMO power converter 128 includes a cross-regulation switch 132, which can transfer energy to the power source 124 to improve cross-regulation performance. In addition to the cross-regulation switch 132, the SIMO power converter 128 includes an inductor and other switches, as further described with respect to FIG. 3.

In the depicted configuration, the control circuitry 130 is integrated within the power transfer circuit 126. In other implementations, the control circuitry 130 (or a portion of the control circuitry 130) can be external to the power transfer circuit 126, and implemented by the PMIC, the application processor 108, a main processor, a secondary processor, or a low-power digital signal processor of the computing device 102. Alternatively, the control circuitry 130 can be implemented by a microcontroller or hardware (e.g., separate circuitry, fixed logic circuitry, or hard-coded logic) that is internal or external to the power transfer circuit 126.

Figure 2:
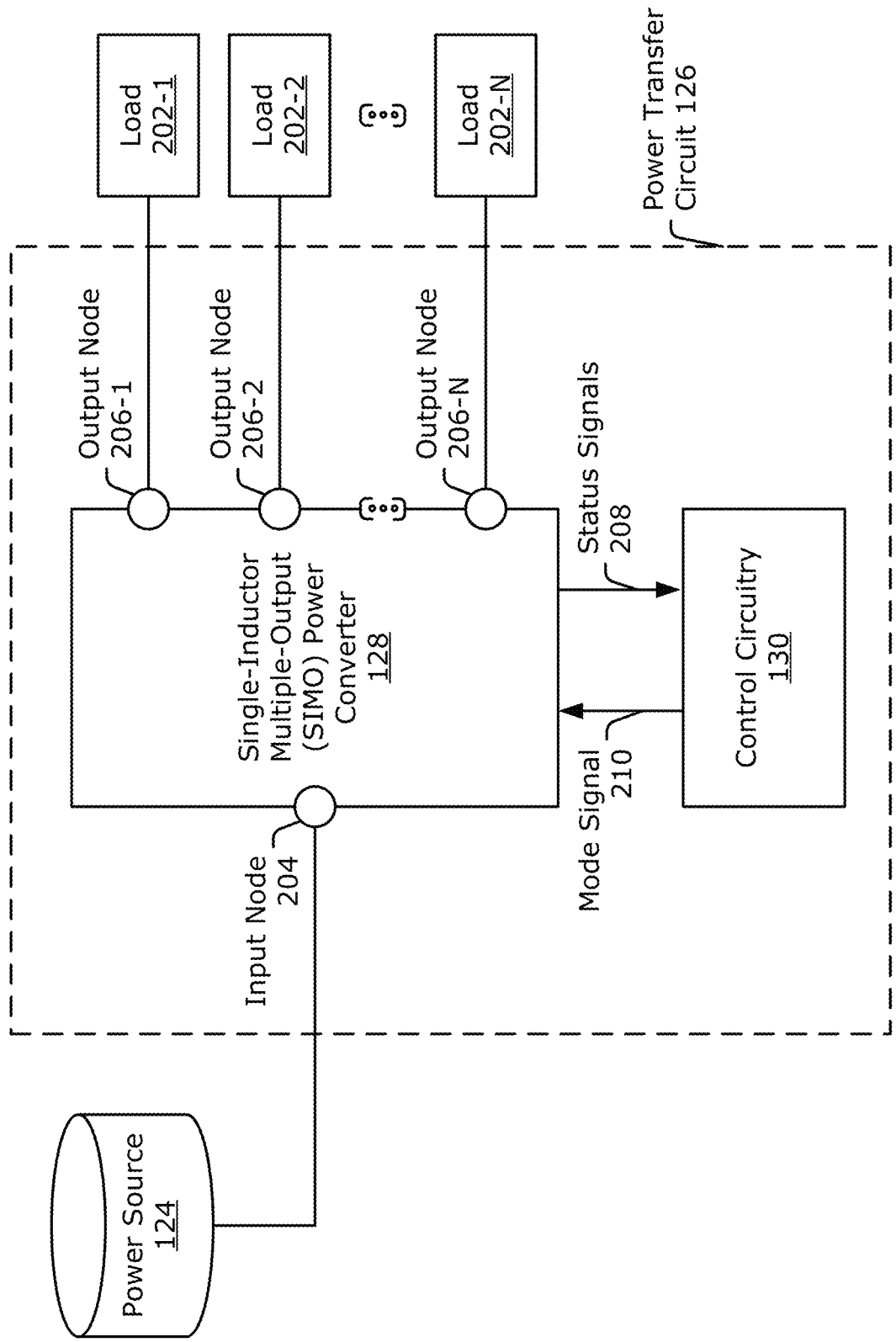
FIG. 2 illustrates an example implementation of a power transfer circuit with a SIMO power converter that can employ a cross-regulation switch.

The control circuitry 130 monitors performance of the SIMO power converter 128 and controls operational states of the switches within the SIMO power converter 128, including an operational state of the cross-regulation switch 132. In particular, the control circuitry 130 regulates an inductor current that flows through the inductor of the SIMO power converter 128. By controlling the operational states of the switches, the control circuitry 130 can increase or decrease the inductor current to transfer power from the power source to the multiple loads 202-1 to 202-N (as shown in FIG. 2), or to mitigate cross-regulation problems using the cross-regulation switch 132. The power transfer circuit 126 is further described with respect to FIG. 2.

FIG. 2 illustrates an example implementation of the power transfer circuit 126 with the SIMO power converter 128 that can employ the cross-regulation switch 132. In the depicted configuration, the power transfer circuit 126 is coupled between the power source 124 and multiple loads 202-1, 202-2 . . . 202-N, with N representing a positive integer greater than one. The SIMO power converter 128 includes an input node 204 and multiple outputs nodes 206-1, 206-2 . . . 206-N. A quantity of output nodes may equal a quantity of loads, or may differ. The input node 204 is coupled to the power source 124 and the multiple output nodes 206-1 to 206-N are respectively coupled to the multiple loads 202-1 to 202-N.

The control circuitry 130 is coupled to the SIMO power converter 128 and accepts one or more status signals 208 from the SIMO power converter 128. The status signals 208 carry operational information of the SIMO power converter 128, including respective output voltages at the output nodes 206-1 to 206-N, an amount of current flowing through the inductor of the SIMO power converter 128, and an operational state of the cross-regulation switch 132 (e.g., of FIGS. 1 and 3). Using this information, the control circuitry 130 generates at least one mode signal 210 to control a switch configuration of the SIMO power converter 128. In some cases, the mode signal 210 includes multiple bits that respectively control operational states of individual switches within the SIMO power converter 128. Alternatively, the control circuitry 130 can generate multiple mode signals 210 to respectively control the operational states of individual switches.

In some situations, the computing device 102 supports multiple operational modes, including a transmission mode, a reception mode, different power modes (e.g., a high-power mode and a low-power mode), different wireless communication modes (e.g., a connected mode, an inactive mode, and an idle mode), and so forth. During operation, the computing device 102 can transition between these different operational modes, which can cause an operating condition associated with one or more of the loads 202-1 to 202-N to change. This can result in a cross-regulation event in which a change to a first output voltage associated with a first load 202-1 causes a second output voltage associated with a second load 202-2 to significantly increase or decrease (e.g., undershoot or overshoot) if the control circuitry 130 does not act to mitigate cross-regulation problems.

One type of cross-regulation event includes a load-step event in which a current provided to one of the loads 202-1 to 202-N increases or decreases. Another type of cross-regulation event includes a reference-step event, in which a reference voltage associated with one of the loads 202-1 to 202-N increases or decreases. The control circuitry 130 can detect either of these cross-regulation events and use the cross-regulation switch 132 to reduce the resulting overshoot or undershoot, thereby improving the cross-regulation performance of the SIMO power converter 128. The SIMO power converter 128 is further described with respect to FIG. 3.

Figure 3:
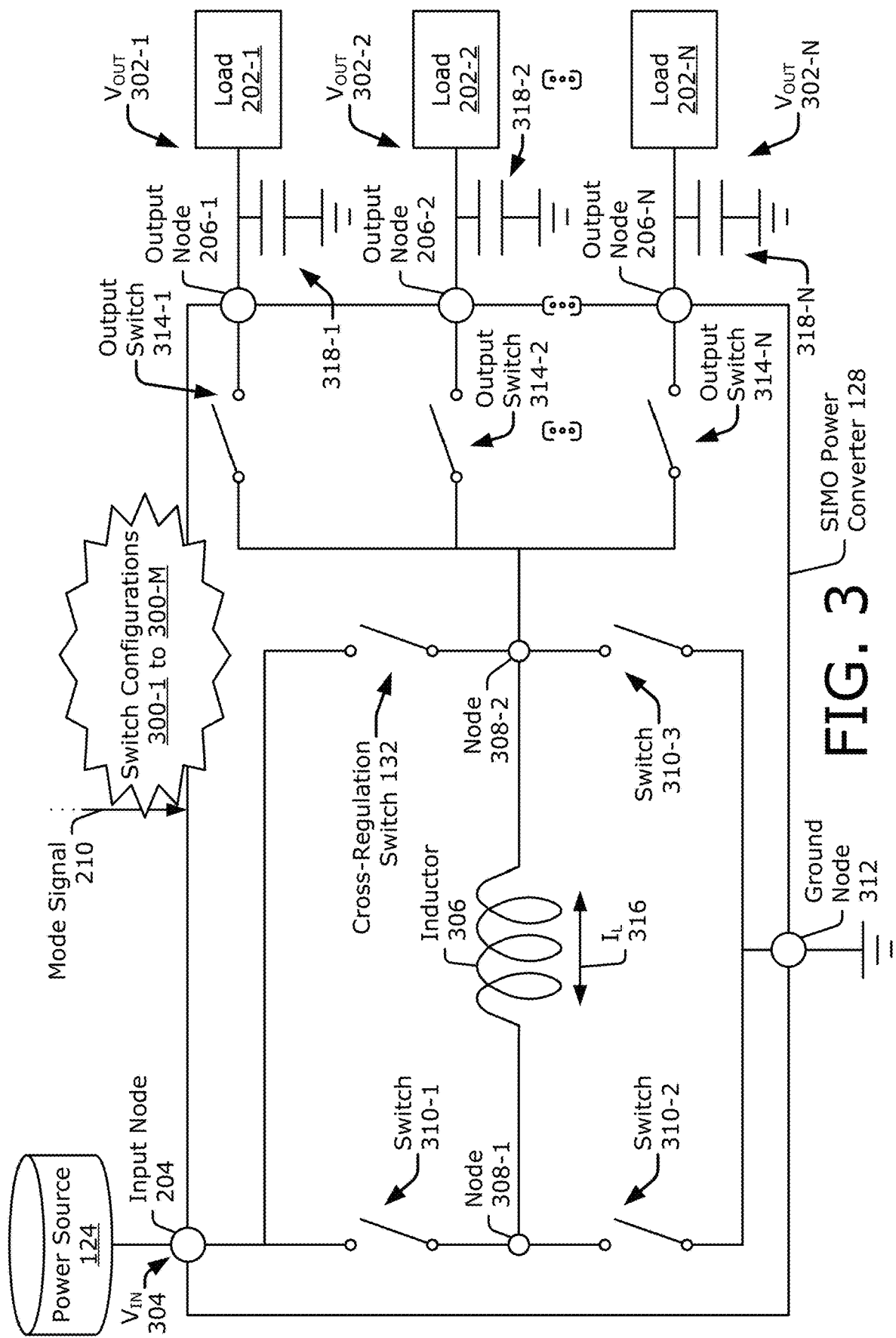
FIG. 3 illustrates an example implementation of a SIMO power converter with a cross-regulation switch.

FIG. 3 illustrates an example implementation of the SIMO power converter 128 with the cross-regulation switch 132. The SIMO power converter 128 provides respective output voltages ($V_{OUT}$) 302-1, 302-2 ... 302-N to the output nodes 206-1 to 206-N based on an input voltage ($V_{IN}$) 304 that is provided by the power source 124. In the depicted configuration, the SIMO power converter 128 is implemented as a buck-boost power converter, which is capable of generating the output voltages 302-1 to 302-N such that one or more of the output voltages 302-1 to 302-N are greater than the input voltage 304, less than the input voltage 304, or a combination thereof. Although illustrated as a buck-boost power converter, the SIMO power converter 128 can alternatively be implemented as a buck power converter or a boost power converter.

Components of the SIMO power converter 128 include an inductor 306 that is coupled between a first node 308-1 and a second node 308-2. The SIMO power converter 128 also includes a first switch 310-1 coupled between the input node 204 and the first node 308-1, a ground node 312 coupled to ground, and a second switch 310-2 coupled between the first node 308-1 and the ground node 312. The cross-regulation switch 132 is coupled between the input node 204 and the second node 308-2. The SIMO power converter 128 also includes multiple output switches 314-1, 314-2 ... 314-N respectively coupled between the second node 308-2 and the multiple output nodes 206-1 to 206-N.

If the SIMO power converter 128 implements a boost power converter or a buck-boost power converter, the SIMO power converter 128 also includes a third switch 310-3, which is coupled between the second node 308-2 and the ground node 312. Alternatively, if the SIMO power converter 128 implements the buck converter, the third switch 310-3 is optional and may or may not be included. The switches 310-1 to 310-3, the cross-regulation switch 132, and the output switches 314-1 to 314-N can be implemented using transistors, for instance.

During operation, the SIMO power converter 128 accepts the mode signal 210 from the control circuitry 130. The mode signal 210 specifies a switch configuration of the SIMO power converter 128. The switch configuration can be one switch configuration of multiple switch configurations 300-1 to 300-M, with M representing a positive integer greater than two. Each switch configuration 300 represents a set of operational states of the switches 310-1 to 310-3, the cross-regulation switch 132, and the output switches 314-1 to 314-N. The operational states include an open state in which a switch connects two nodes together and a closed state in which the switch disconnects the two nodes from each other.

By specifying different switch configurations, the control circuitry 130 can adjust an inductor current ($I_L$) 316 that flows through the inductor 306. A first switch configuration 300-1, for example, can charge a magnetic field associated with the inductor 306 (e.g., charge the inductor 306) and increase the inductor current 316. In contrast, a second switch configuration can discharge the magnetic field (e.g., discharge the inductor 306) and decrease the inductor current 316. Alternating between the first switch configuration and the second switch configuration enables the SIMO power converter 128 to transfer power from the power source 124 to the loads 202-1 to 202-N. Generally, the inductor current 316 is time-shared between the multiple loads 202-1 to 202-N to enable power to be transferred to multiple loads. Additionally, another switch configuration (e.g., a switch configuration 300-4 of FIG. 6) can discharge the inductor 306 to transfer available energy that is stored within the inductor to the power source 124 to improve cross-regulation performance. These different types of switch configurations are further described with respect to FIGS. 4-6.

Figure 4:
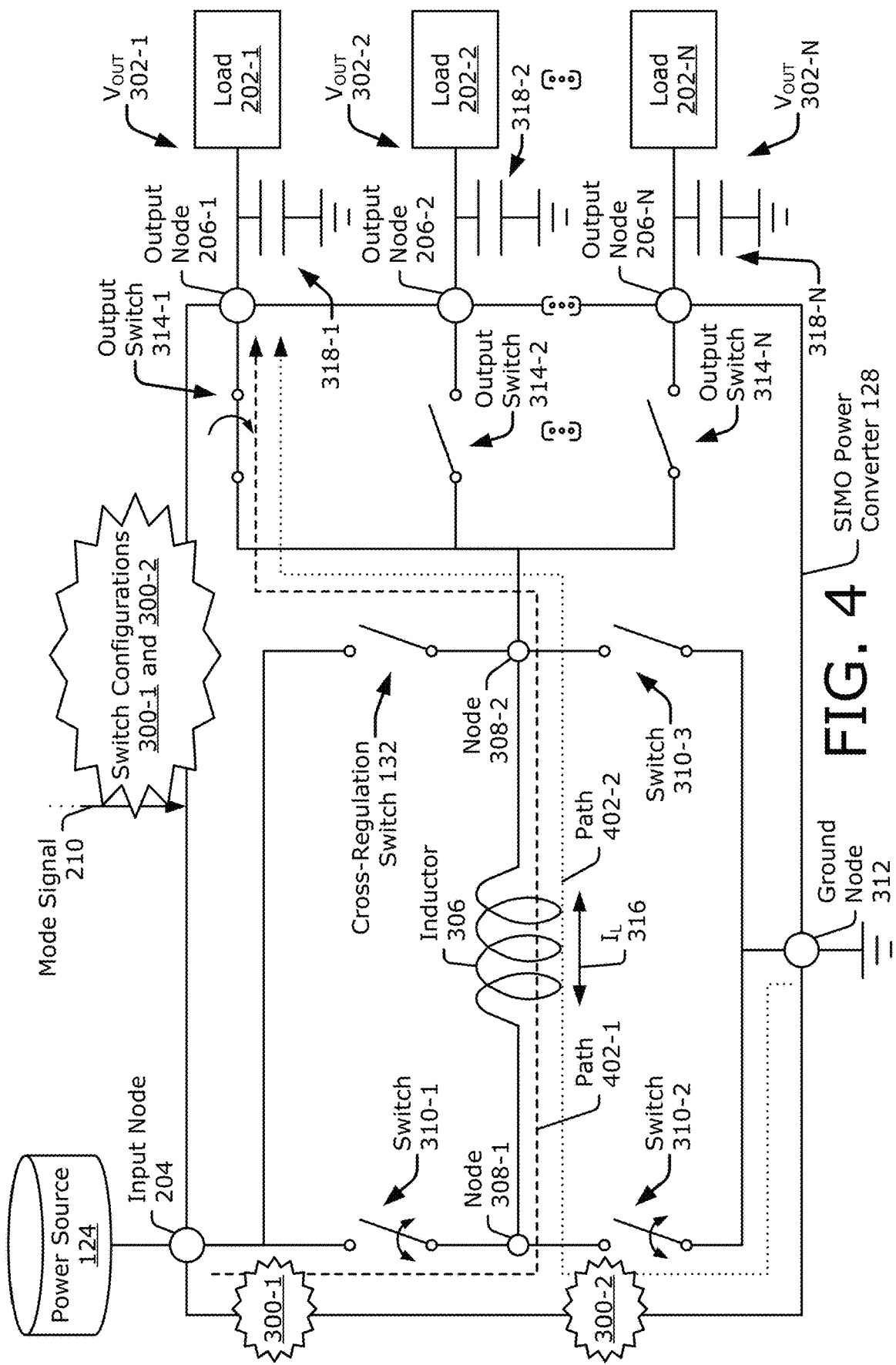
FIG. 4 illustrates example switch configurations of a SIMO power converter that operates as a buck power converter and employs a cross-regulation switch.

FIG. 4 illustrates example switch configurations of the SIMO power converter 128, which operates as a buck power converter here and employs the cross-regulation switch 132. In the depicted configuration, the SIMO power converter 128 transfers power from the power source 124 to the load 202-1. In particular, the control circuitry 130 causes the SIMO power converter 128 to operate in a first switch configuration 300-1 to charge the inductor 306 via a path 402-1, and operate in a second switch configuration 300-2 to discharge the inductor 306 via a path 402-2. Although not shown, the control circuitry 130 can cause the SIMO power converter 128 to operate in other additional switch configurations to transfer power to the other loads 202-2 to 202-N.

In the first switch configuration 300-1, the first switch 310-1 and the output switch 314-1 are in the closed state. The remaining output switches 314-2 to 314-N, the switches 310-2 and 310-3, and the cross-regulation switch 132 are in the open state. As such, the inductor 306 charges and the inductor current 316 increases. The control circuitry 130 can measure the inductor current 316 and cause the SIMO power converter 128 to transition to the second switch configuration 300-2 responsive to the inductor current 316 reaching an upper limit.

In the second switch configuration 300-2, the second switch 310-2 and the output switch 314-1 are in the closed state. The remaining output switches 314-2 to 314-N, the switches 310-1 and 310-3, and the cross-regulation switch 132 are in the open state. As such, the inductor 306 discharges and the inductor current 316 decreases. The control circuitry 130 can measure the inductor current 316 and cause the SIMO power converter 128 to transition to the first switch configuration 300-1 responsive to the inductor current 316 reaching a lower limit. Using both the first switch configuration 300-1 and the second switch configuration 300-2, the SIMO power converter 128 powers the load 202-1.

To transfer power to the load 202-2, the mode signal 210 can cause the SIMO power converter 128 to operate in another switch configuration (not shown). This other switch configuration is similar to the second switch configuration 300-2, except the output switch 314-1 is in the open state and the output switch 314-2 is in the closed state. While the other output switches 314-1 to 314-N are closed, respective capacitors 318-1 to 318-N transfer energy to the corresponding loads 202-1 to 202-N.

Figure 5:
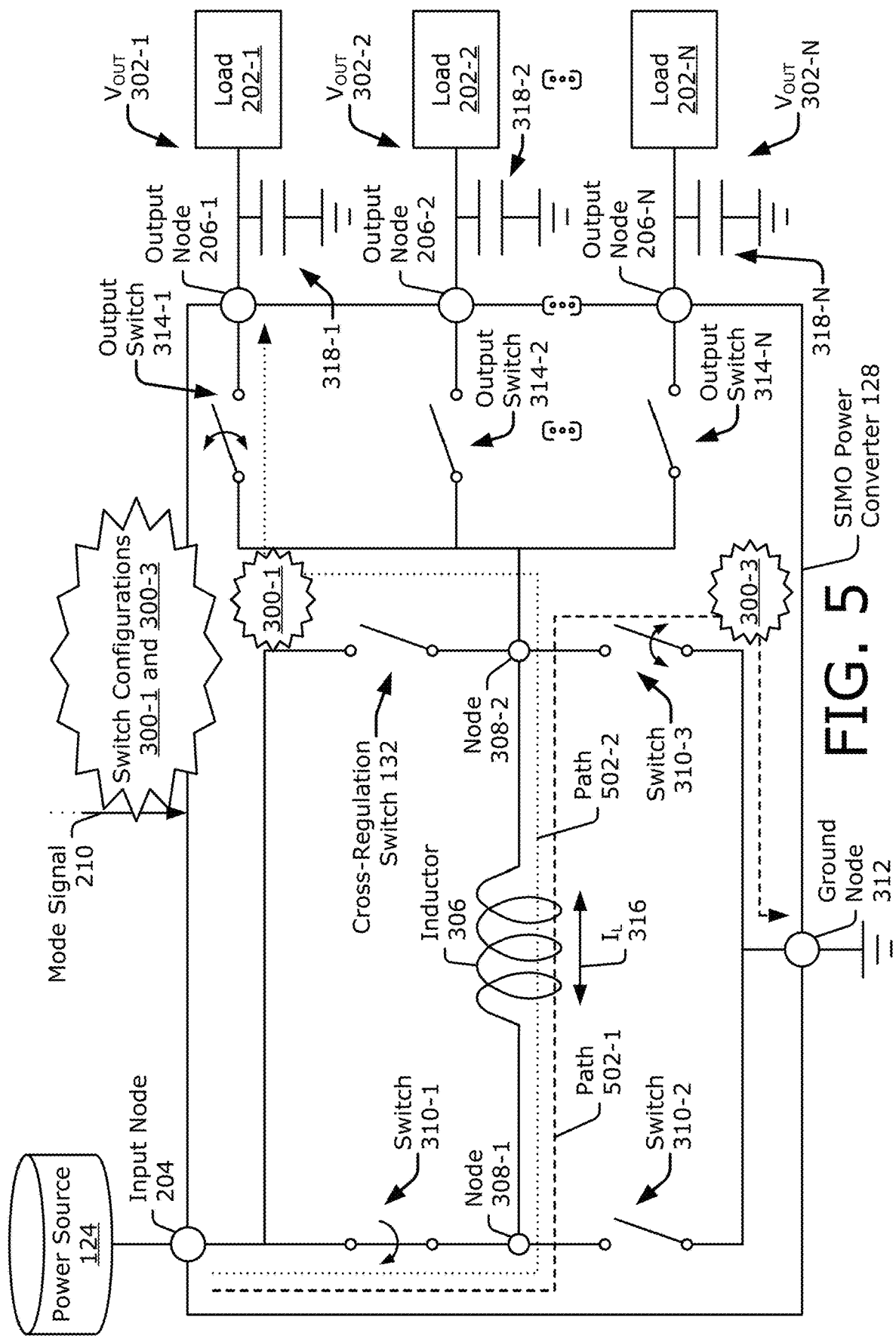
FIG. 5 illustrates example switch configurations of a SIMO power converter that operates as a boost power converter and employs a cross-regulation switch.

FIG. 5 illustrates example switch configurations of the SIMO power converter 128, which operates as a boost power converter here and employs the cross-regulation switch 132. In the depicted configuration, the control circuitry 130 transfers power from the power source 124 to the load 202-1. In particular, the control circuitry 130 causes the SIMO power converter 128 to operate in a third switch configuration 300-3 to charge the inductor 306 via a path 502-1, and operate in the first switch configuration 300-1 to discharge the inductor 306 via a path 502-2 (e.g., the path 402-1 of FIG. 4). Although not shown, the control circuitry 130 can cause the SIMO power converter 128 to operate in other switch configurations to transfer power to the other loads 202-2 to 202-N.

In the third switch configuration 300-3, the first switch 310-1 and the third switch 310-3 are in the closed state. The output switches 314-1 to 314-N, the switch 310-2, and the cross-regulation switch 132 are in the open state. As such, the inductor 306 charges, and the inductor current 316 increases. The control circuitry 130 can measure the inductor current 316 and cause the SIMO power converter 128 to transition to the first switch configuration 300-1 responsive to the inductor current 316 reaching an upper limit.

In the first switch configuration 300-1, the first switch 310-1 and the output switch 314-1 are in the closed state. The remaining output switches 314-2 to 314-N, the switches 310-2 and 310-3, and the cross-regulation switch 132 are in the open state. As such, the inductor 306 discharges, and the inductor current 316 decreases. The control circuitry 130 can measure the inductor current 316 and cause the SIMO power converter 128 to transition to the third switch configuration 300-3 responsive to the inductor current 316 reaching a lower limit. Using both the third switch configuration 300-3 and the first switch configuration 300-1, the SIMO power converter 128 powers the load 202-1.

To transfer power to the load 202-2, the mode signal 210 can cause the SIMO power converter 128 to operate in another switch configuration. This other switch configuration is similar to the first switch configuration 300-1, except the output switch 314-1 is in the open state, and the output switch 314-2 is in the closed state. While the other output switches 314-1 to 314-N are closed, the capacitors 318-1 to 318-N transfer energy to the corresponding loads 202-1 to 202-N.

Figure 6:
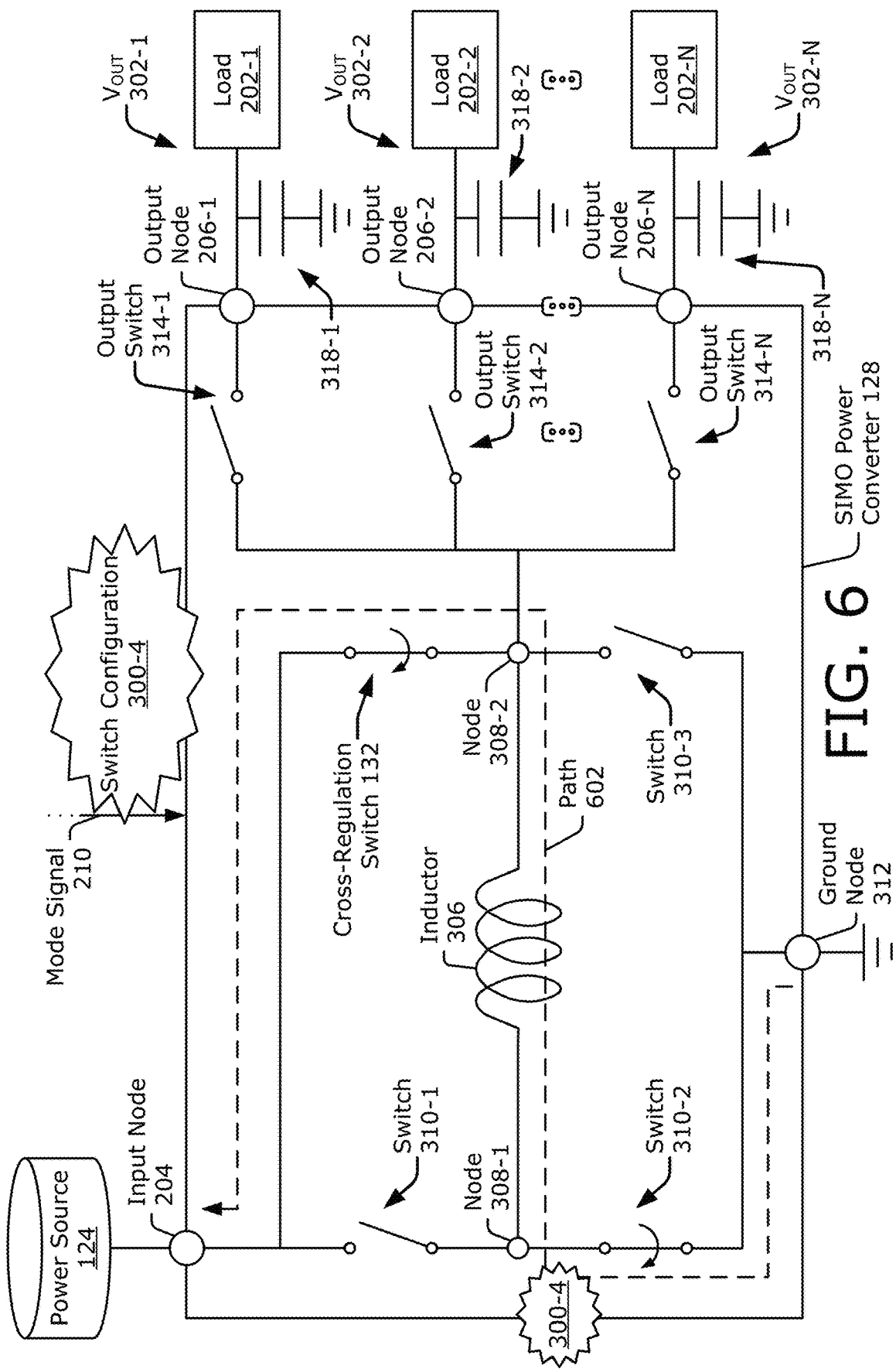
FIG. 6 illustrates another example switch configuration of a SIMO power converter using a cross-regulation switch to improve cross-regulation performance.

FIG. 6 illustrates another example switch configuration of the SIMO power converter 128 using the cross-regulation switch 132 to improve cross-regulation performance. In the depicted configuration, the SIMO power converter 128 transfers energy from the inductor 306 to the power source 124. In particular, the control circuitry 130 causes the SIMO power converter 128 to operate in a fourth switch configuration 300-4 to discharge the inductor 306 via a path 602.

In the fourth configuration 300-4, the second switch 310-2 and the cross-regulation switch 132 are in the closed state. The switches 310-1 and 310-3 and the output switches 314-1 to 314-N are in the open state. As such, the inductor 306 discharges, and the inductor current 316 decreases. By transferring at least a portion of the energy that is stored within the inductor 306 to the power source 124, overshoots and/or undershoots resulting from a cross-regulation event are reduced, which improves cross-regulation performance. The control circuitry 130 can cause the SIMO power converter 128 to operate in the fourth switch configuration 300-4 responsive to detecting a cross-regulation event, an example of which is further described with respect to FIG. 8.

Figure 7:
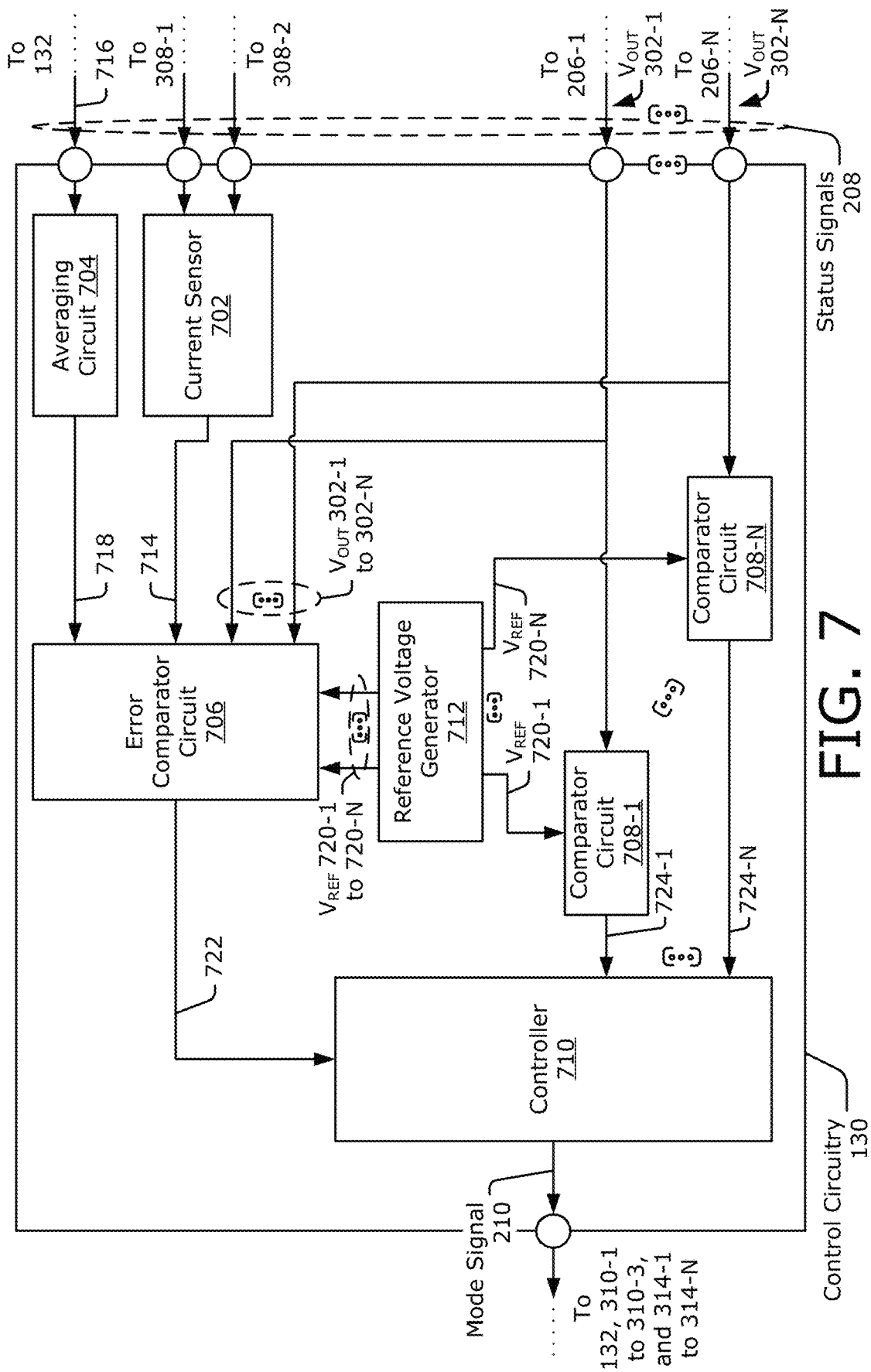
FIG. 7 illustrates an example implementation of control circuitry that controls a cross-regulation switch of a SIMO power converter to improve cross-regulation performance.

FIG. 7 illustrates an example implementation of the control circuitry 130. In the depicted configuration, the control circuitry 130 includes a current sensor 702, an averaging circuit 704, an error comparator circuit 706, at least two comparator circuits 708-1 to 708-N, and a controller 710. The current sensor 702 can be implemented using a network of resistors and capacitors. The averaging circuit 704 can be implemented as a filter. The error comparator circuit 706 and the comparator circuits 708-1 to 708-N can be implemented with operational amplifiers. The control circuitry 130 is also shown to include a reference voltage generator 712; however, the reference voltage generator 712 can alternatively be implemented separate from the control circuitry 130 or separate from the power transfer circuit 126.

Within the control circuitry 130, the error comparator circuit 706 is coupled to the current sensor 702, the averaging circuit 704, and the reference voltage generator 712. The comparator circuits 708-1 to 708-N are coupled to the reference voltage generator 712. The controller 710 is coupled to the error comparator circuit 706 and the comparator circuits 708-1 to 708-N.

With respect to the SIMO power converter 128, the current sensor 702 is coupled to the first node 308-1 and the second node 308-2. The averaging circuit 704 is coupled to the cross-regulation switch 132. The comparator circuits 708-1 to 708-N are respectively coupled to the output nodes 206-1 to 206-N. The error comparator circuit 706 is also coupled to the output nodes 206-1 to 206-N. The controller 710 is coupled to the switches 310-1 to 310-3, the output switches 314-1 to 314-N, and the cross-regulation switch 132.

During operation, the current sensor 702 measures the inductor current 316 (of FIG. 3) based on voltages at the first node 308-1 and the second node 308-2 and an internal resistance ($R_S$). The current sensor 702 can generate a signal 714 with a voltage that represents a magnitude of the inductor current 316.

The averaging circuit 704 determines an average amount of time the SIMO power converter 128 operates in the fourth switch configuration 300-4. This represents an amount of additional energy that is available due to a cross-regulation event. As an example, the averaging circuit 704 accepts a cross-regulation control signal 716 with a voltage that varies between a high state and a low state according to whether the cross-regulation switch 132 is in the closed state or the open state (or vice versa). Generally, the cross-regulation control signal 716 varies according to the mode signal 210. In this case, the averaging circuit 704 averages the voltage of the cross-regulation control signal 716 to generate an average cross-regulation control signal 718. Thus, a voltage of the average cross-regulation control signal 718 represents the average voltage of the cross-regulation control signal 716 across a certain window of time.

The reference voltage generator 712 generates multiple reference voltages ($V_{REF}$) 720-1 to 720-N, which respectively represent target levels of the output voltages 302-1 to 302-N according to operating conditions of the loads 202-1 to 202-N. As described above, the reference voltages 720-1 to 720-N can dynamically change over time as an operational mode of the computing device 102 changes or as the computing device 102 performs different operations using the loads 202-1 to 202-N. For example, the reference voltage generator 712 can increase the reference voltage 720-1 responsive to the load 202-1 transitioning from a low-power state to a high-power state. This larger reference voltage 720-1 causes the control circuitry 130 to increase the output voltage 302-1. Alternatively, the reference voltage generator 712 can decrease the reference voltage 720-1 responsive to the load 202-1 transitioning from the high-power state to the low-power state. Accordingly, this smaller reference voltage 720-1 causes the control circuitry 130 to decrease the output voltage 302-1.

The error comparator circuit 706 accepts the signal 714 from the current sensor 702, the average cross-regulation control signal 718 from the averaging circuit 704, the output voltages 302-1 to 302-N from the output nodes 206-1 to 206-N, and the reference voltages 720-1 to 720-N from the reference voltage generator 712. The error comparator circuit 706 determines an amount the inductor current 316 differs from a target inductor current and generates an error summing signal having a voltage that represents this error amount. In particular, the voltage of the error summing signal ($V_{Error}$) is approximately equal to the following as shown in Equation 1:

$$V_{Error} = I_L R_S - I_{Lavg} R_S - V_{avg} + \Sigma_{x=1}^{N}(V_{REFx} - V_{OUTx})$$ Equation 1 where $I_L$ represents the inductor current 316, $R_S$ represents a resistance associated with the current sensor 702, $I_{Lavg}$ represents an average of the inductor current 316, $V_{avg}$ represents the voltage of the average cross-regulation control signal 718, $V_{REFx}$ represents one of the reference voltages 720-1 to 720-N, and $V_{OUTx}$ represents one of the output voltages 302-1 to 302-N. Generally, a value of the resistance $R_S$ can vary according to different processes and design implementations, which affects the error voltage ($V_{Error}$) and a loop bandwidth of the control circuitry 130. Using the average cross-regulation control signal 718 to determine the error summing signal, however, desensitizes the loop bandwidth from this resistance $R_S$. This further decreases overshoot or undershoot in a transient response of the power transfer circuit 126. Accounting for the average cross-regulation control signal 718 also enables the control circuitry 130 to make appropriate adjustments to the inductor current 316 based on the additional energy that is available due to the cross-regulation event.

The error comparator circuit 706 compares the error voltage determined by Equation 1 to an upper limit and a lower limit of a hysteretic window. Based on this comparison, the error comparator circuit 706 generates a logic signal 722 to specify a state transition between switch configurations 300-1 and 300-2, or between switch configurations 300-1 and 300-3.

The comparator circuits 708-1 to 708-N respectively compare the output voltages 302-1 to 302-N to the corresponding reference voltages 720-1 to 720-N. Based on this comparison, the comparator circuits 708-1 to 708-N generate respective comparison signals 724-1 to 724-N, which indicate whether the output voltages 302-1 to 302-N are greater than or less than the respective reference voltages 720-1 to 720-N.

The controller 710 accepts the logic signal 722 along with the comparison signals 724-1 to 724-N. Based on these signals, the controller 710 determines an appropriate switch configuration (e.g., one of the switch configurations 300-1 to 300-4 described with respect to FIGS. 4-6) to reduce the error and approach the target inductor current. Accordingly, the controller 710 generates the mode signal 210 to cause the SIMO power converter 128 to operate according to this determined switch configuration. For example, the controller 710 enables the SIMO power converter 128 to provide appropriate amounts of power to the loads 202-1 to 202-N by causing the SIMO power converter 128 to operate according to the first switch configuration 300-1, the second switch configuration 300-2, or the third switch configuration 300-3.

The controller 710 also uses the comparison signals 724-1 to 724-N to detect a cross-regulation event. For example, the controller 710 detects the cross-regulation event based on at least one of the comparison signals 724-1 to 724-N indicating one or more of the output voltages 302-1 to 302-N are greater than the corresponding reference voltages 720-1 to 720-N. In other implementations, the controller 710 can detect a cross-regulation event based on a change in one or more load currents associated with the output nodes 206-1 to 206-N or based on a change in one or more of the reference voltages 720-1 to 720-N.

Responsive to detecting the cross-regulation event, the controller 710 uses the mode signal 210 to cause the SIMO power converter 128 to transfer energy to the power source 124 according to the fourth switch configuration 300-4 (of FIG. 6). After the comparison signals 724-1 to 724-N indicate that the output voltages 302-1 to 302-N are less than the corresponding reference voltages 720-1 to 720-N, the controller 710 uses the mode signal 210 to cause the SIMO power converter 128 to transition to a different switch configuration to transfer power to the loads 202-1 to 202-N.

Using the techniques described above, a loop bandwidth of the control circuitry 130 can be large and achieve a faster transient load step response or a faster reference step response compared to other types of control circuitry. In general, the logic signal 722 and the comparison signals 724-1 to 724-N enable the controller 710 to make appropriate adjustments to the inductor current 316 while achieving a target cross-regulation performance and a target efficiency, as further described with respect to FIG. 8.

Figure 8:
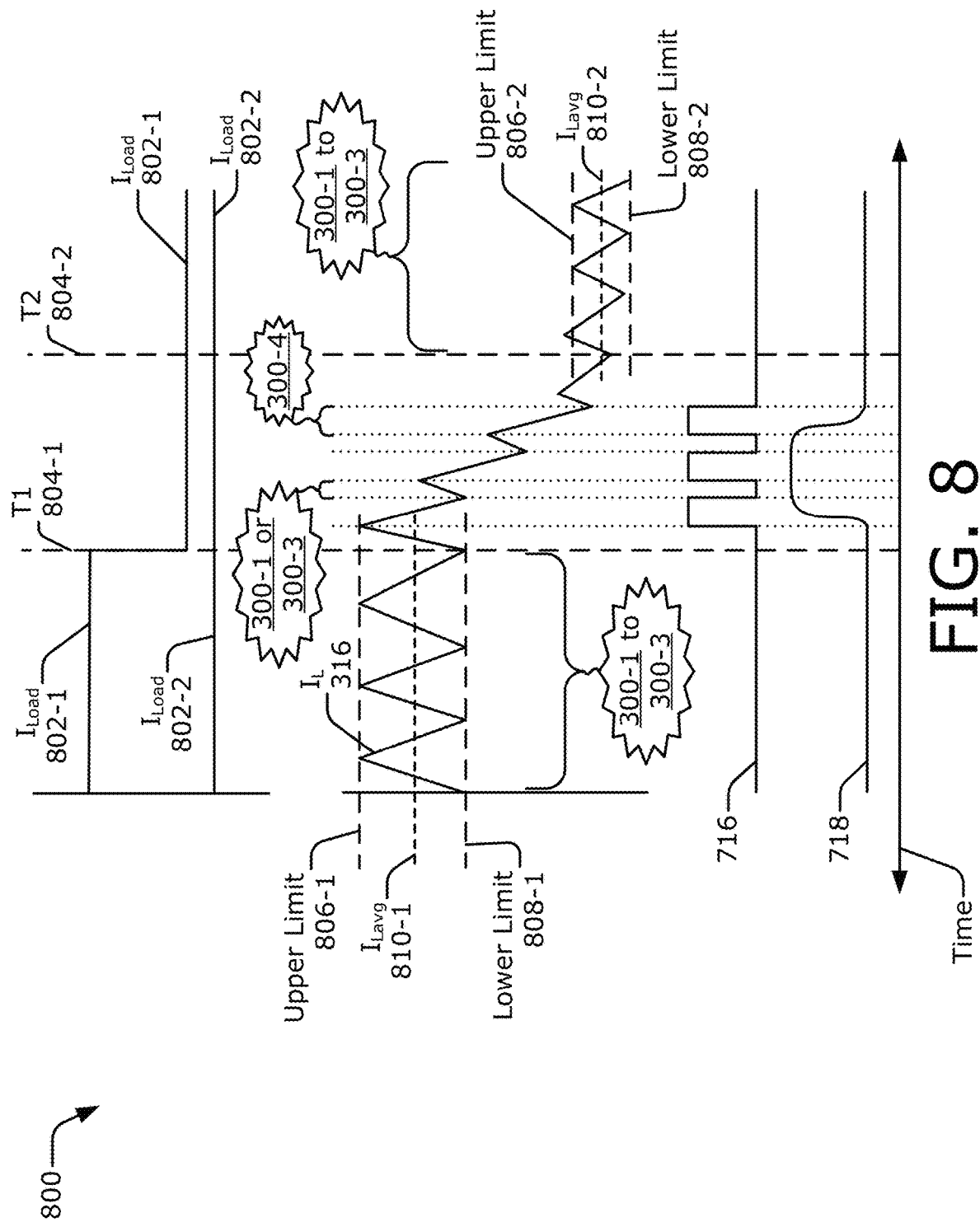
FIG. 8 illustrates example operations of a SIMO power converter with a cross-regulation switch responsive to a current-regulation event.

FIG. 8 illustrates example operations of the SIMO power converter 128 with the cross-regulation switch 132. A graph 800 depicts, over time, magnitudes of a first load current ($I_{Load}$) 802-1, a second load current 802-2, the inductor current 316, a voltage associated with the cross-regulation control signal 716, and a voltage associated with the average cross-regulation control signal 718. The load currents 802-1 and 802-2 represent respective currents that are provided at the output nodes 206-1 and 206-2.

Prior to time T1 804-1, the SIMO power converter 128 transfers power from the power source 124 to the loads 202-1 and 202-2 using at least some of the switch configurations 300-1 to 300-3. In particular, the SIMO power converter 128 can operate as the buck power converter using the switch configurations 300-1 and 300-2 (of FIG. 4), or operate as the boost power converter using the switch configurations 300-1 and 300-3 (of FIG. 5). Consequently, the control circuitry 130 maintains the inductor current 316 between an upper limit 806-1 and a lower limit 808-1. An average magnitude of the inductor current 316 during this time interval is represented by $I_{Lavg}$ 810-1. During this time, the voltage of the cross-regulation control signal 716 indicates that the cross-regulation switch 132 is in the open state. Consequently, the voltage of the average cross-regulation control signal 718 is at a low level.

At time T1 804-1, a load-step event occurs as the first load current 802-1 decreases. In this example, the second load current 802-2 remains relatively constant. The control circuitry 130 detects the load-step event and controls the SIMO power converter 128 to reduce the inductor current 316. Between time T1 804-1 and time T2 804-2, however, the control circuitry 130 determines that one or more of the output voltages 302-1 and 302-2 are greater than the corresponding reference voltages 720-1 and 720-2. Based on this determination, the control circuitry 130 causes the SIMO power converter 128 to operate in the fourth switch configuration 300-4 (of FIG. 6) to transfer energy from the inductor 306 to the power source 124. As such, the voltage of the cross-regulation control signal 716 changes to indicate the cross-regulation switch 132 is in the closed state.

If the control circuitry 130 determines that the output voltages 302-1 and 302-2 are less than the reference voltages 720-1 to 720-2, the control circuitry 130 changes the switch configuration of the SIMO power converter 128 to one of the switch configurations described in FIGS. 4 and 5 to provide a transfer of power to the loads 202-1 and 202-2. Consequently, the cross-regulation switch 132 cycles between the open state and the closed state during this transition period to improve the cross-regulation performance (e.g., reduce the overshoot or the undershoot of the output voltages 302-1 and 302-2). This enables the output voltages 302-1 and 302-2 to remain relatively constant between time T1 804-1 and time T2 804-2.

A voltage of the average cross-regulation control signal 718 also increases as an average time that the cross-regulation switch 132 is in the closed state increases. Because this average time is compensated for within the logic signal 722, the control circuitry 130 can make appropriate adjustments to the inductor current 316 to achieve a second average current 810-2 at time T2 804-2.

At time T2 804-2, the SIMO power converter 128 generates the inductor current 316 within an upper limit 806-2 and a lower limit 808-2, which are based on the load currents 802-1 and 802-2. At this time, the SIMO power converter 128 can operate as the buck power converter and/or the boost power converter based on the switch configurations 300-1 to 300-3.

In contrast to other techniques, the control circuitry 130 enables the SIMO power converter 128 to achieve a target cross-regulation performance without significantly degrading efficiency by causing the SIMO power converter 128 to operate in different switch configurations 300-1 to 300-M according to whether or not a cross-regulation event is detected. In this way, the control circuitry 130 causes the SIMO power converter 128 to operate in the fourth switch configuration 300-4 if the cross-regulation event occurs, and causes the SIMO power converter 128 to operate in another switch configuration (e.g., the switch configurations 300-1 to 300-3) to transfer power to the loads 202-1 to 202-N otherwise. By actively monitoring for the cross-regulation event and dynamically adjusting the switch configurations 300-1 to 300-M accordingly, the SIMO power converter 128 can realize improved cross-regulation performance and operate at a similar efficiency as another SIMO power converter that does not include the cross-regulation switch 132.

Although not explicitly shown, the control circuitry 130 can use the cross-regulation switch 132 to improve cross-regulation performance if the load current 802-1 increases from a low value to a high value (e.g., another load-step event occurs). In this case, the output voltage 302-1 can decrease, however, use of the cross-regulation switch 132 enables the output voltage 302-2 to remain relatively constant, thereby improving the cross-regulation performance.

As another example, a reference-step event can occur in which a reference voltage 720-1 to 720-N increases from a low level to a high level. In response to this increase, the control circuitry 130 increases the inductor current 316 and the output voltage 302-1. Once the output voltage 302-1 is greater than the reference voltage 720-1; however, the control circuitry 130 uses the cross-regulation switch 132 to reduce an amount of overshoot experienced by the output voltage 302-1. Consequently, the output voltage 302-2 remains relatively constant during this time period.

Figure 9:
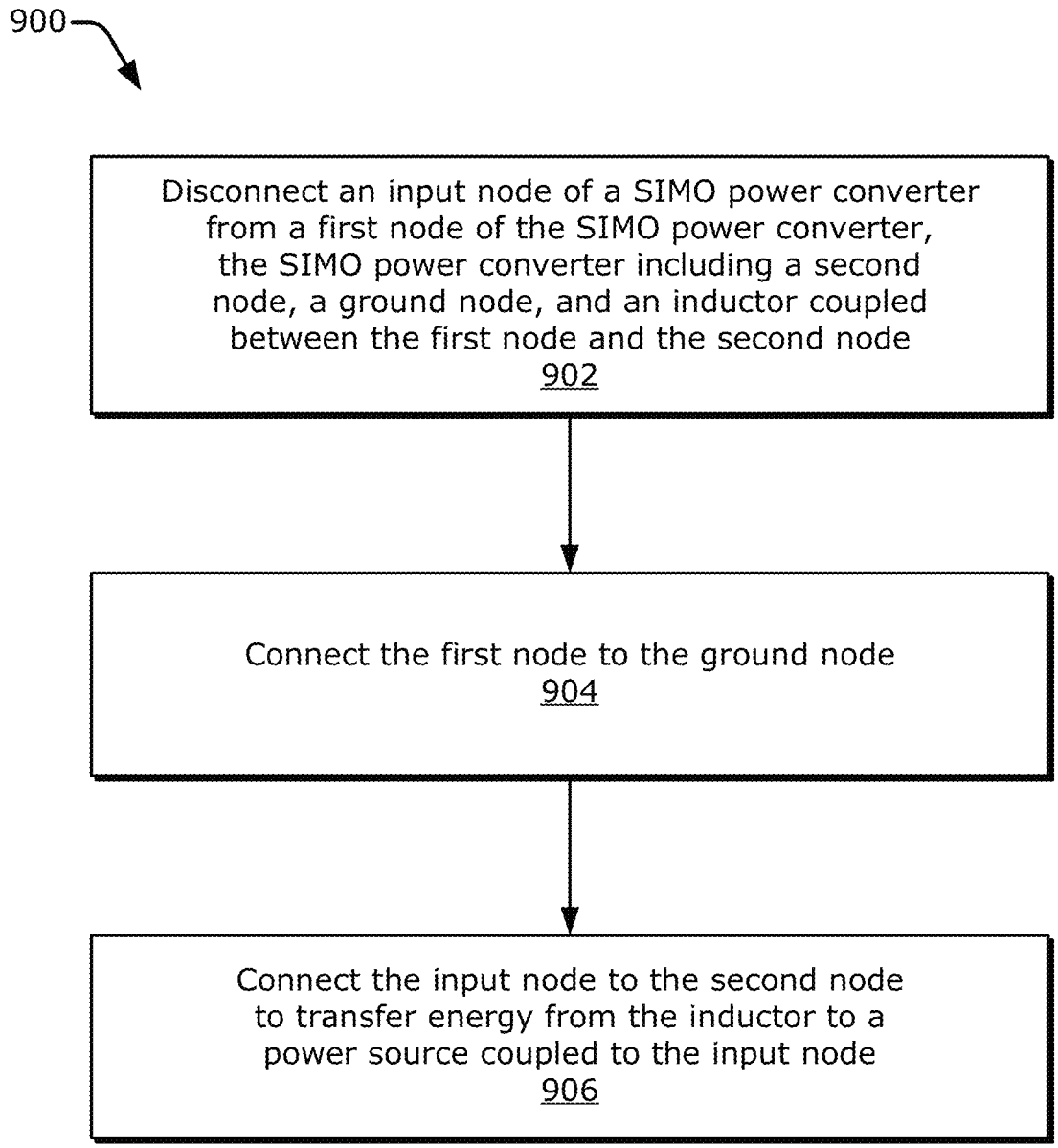
FIG. 9 is a flow diagram illustrating an example process that can be performed by a single-inductor multiple-output power converter with a cross-regulation switch.

FIG. 9 is a flow diagram illustrating an example process 900 that can be performed at least partially by a SIMO power converter with a cross-regulation switch. The process 900 is described in the form of a set of blocks 902-906 that specify operations that can be performed. However, operations are not necessarily limited to the order shown in FIG. 9 or described herein, for the operations may be implemented in alternative orders or in fully or partially overlapping manners. Operations represented by the illustrated blocks of the process 900 may be performed by a computing device 102 (e.g., of FIG. 1) or a power transfer circuit 126 (e.g., of FIG. 1 or 2). More specifically, the operations of the process 900 may be performed, at least partially, by a SIMO power converter 128 as shown in FIG. 3.

At block 902, an input node of a SIMO power converter is disconnected from a first node of the SIMO power converter. The SIMO power converter includes a second node, a ground node, and an inductor coupled between the first node and the second node. For example, the first switch 310-1 disconnects the input node 204 of the SIMO power converter 128 from the first node 308-1. The control circuitry 130 can provide the SIMO power converter 128 the mode signal 210 to cause the first switch 310-1 to be in the open state. The SIMO power converter 128 includes the second node 308-2, the ground node 312, and the inductor 306, which is coupled between the first node 308-1 and the second node 308-2. The SIMO power converter 128 can be a buck converter, a boost converter, or a buck-boost converter.

At block 904, the first node is connected to the ground node. For example, the second switch 310-2 connects the first node 308-1 to the ground node 312. The control circuitry 130 can provide the SIMO power converter 128 the mode signal 210 to cause the second switch 310-2 to be in the closed state.

At block 906, the input node is connected to the second node to transfer energy from the inductor to a power source coupled to the input node. For example, the cross-regulation switch 132 connects the input node 204 to the second node 308-2. The control circuitry 130 can provide the SIMO power converter 128 the mode signal 210 to cause the cross-regulation switch 132 to be in the closed state. In this switch configuration, energy is transferred from the inductor 306 to the power source 124. The control circuitry 130 can cause the SIMO power converter 128 to operate in this switch configuration responsive to detecting a cross-regulation event. The cross-regulation event can occur in response to a change in an output current associated with a load or a change in a reference voltage associated with the load.

The terms "first," "second," "third," and so forth are used herein to identify or distinguish similar or analogous items from one another within a given contex—such as a particular implementation, a single drawing figure, or a claim. Thus, a first item in one context may differ from a first item in another context. Additionally, these terms do not necessarily indicate a temporal order. For example, the SIMO power converter 128 can operate in the first switch configuration 300-1 during a first time interval that occurs before or after a second time interval in which the SIMO power converter 128 operates in the second switch configuration 300-2.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus with a single-inductor multiple-output power converter, comprising:
    the single-inductor multiple-output power converter including:
        an input node configured to be coupled to a power source;
        a first node, a second node, and a ground node;
        at least two output nodes configured to be respectively coupled to at least two loads, the at least two output nodes coupled to the second node;
        an inductor coupled between the first node and the second node;
        a first switch coupled between the input node and the first node;
        a second switch coupled between the first node and the ground node; and
        a cross-regulation switch coupled between the input node and the second node; and
    control circuitry coupled to the single-input multiple-output power converter, the control circuitry configured to:
        detect that at least one output voltage at the at least two output nodes is greater than a reference voltage; and
        responsive to the at least one output voltage being greater than the reference voltage, cause the first switch to be in an open state, the second switch to be in a closed state, and the cross-regulation switch to be in the closed state.

2. The apparatus of claim 1, wherein:
    the first switch is configured to be in the open state to disconnect the input node from the first node;
    the second switch is configured to be in the closed state to connect the first node to the ground node; and
    the cross-regulation switch is configured to be in the closed state to connect the input node to the second node.

3. The apparatus of claim 2, wherein:
    the first switch is configured to be in the closed state during a first time interval to connect the input node to the first node;
    the second switch is configured to be in the open state during the first time interval to disconnect the first node from the ground node;
    the cross-regulation switch is configured to be in the open state during the first time interval to disconnect the input node from the second node; and
    the control circuitry is configured to cause the first switch to be in the open state and both the second switch and the cross-regulation switch to be in the closed state during a second time interval that occurs after the first time interval.

4. The apparatus of claim 3, wherein:
    the first switch is configured to be in the open state during a third time interval to disconnect the input node from the first node;
    the second switch is configured to be in the closed state during the third time interval to connect the first node to the ground node; and
    the cross-regulation switch is configured to be in the open state during the third time interval to disconnect the input node from the second node.

5. The apparatus of claim 4, wherein:
    the at least two output nodes include a first output node; and
    the single-inductor multiple output power converter includes:
        at least two output switches respectively coupled between the at least two output nodes and the second node, the at least two output switches including a first output switch coupled between the second node and the first output node, the first output switch configured to selectively:
            be in the open state during the second time interval to disconnect the second node from the first output node; and
            be in the closed state during the first time interval and the third time interval to connect the second node to the first output node.

6. The apparatus of claim 5, further comprising:
    a wireless transceiver including an amplifier, wherein:
    the power source comprises a battery; and
    a first load of the at least two loads comprises the amplifier.

7. The apparatus of claim 5, wherein the single-inductor multiple output power converter is configured to:
    charge the inductor during the first time interval and discharge the inductor during the third time interval to deliver power to the first output node; and
    discharge the inductor during the second time interval to transfer energy from the inductor to the power source, the second time interval occurring after the first time interval or the third time interval.

8. The apparatus of claim 5, wherein the single-inductor multiple output power converter includes a third switch coupled between the second node and the ground node; the third switch configured to selectively be in the open state during the first time interval, the second time interval, and the third time interval to disconnect the second node from the ground node.

9. The apparatus of claim 8, wherein:
the first switch is configured to be in the closed state during a fourth time interval to connect the input node to the first node;
the second switch is configured to be in the open state during the fourth time interval to disconnect the first node from the ground node;
the cross-regulation switch is configured to be in the open state during the fourth time interval to disconnect the input node from the second node;
the third switch is configured to be in the closed state during the fourth time interval to connect the second node to the ground node; and
the first output switch is configured to be in the open state during the fourth time interval to disconnect the second node from the first output node.

10. The apparatus of claim 9, wherein the single-inductor multiple output power converter is configured to:
charge the inductor during the fourth time interval;
discharge the inductor during the first time interval to deliver power to the first output node, the first time interval occurring after the fourth time interval; and
discharge the inductor during the second time interval to transfer energy from the inductor to the power source, the second time interval occurring after the first time interval or the fourth time interval.

11. The apparatus of claim 3, wherein:
the first switch is configured to be in the closed state during a third time interval to connect the input node to the first node;
the second switch is configured to be in the open state during the third time interval to disconnect the first node from the ground node;
the cross-regulation switch is configured to be in the open state during the third time interval to disconnect the input node from the second node; and
the single-inductor multiple-output power converter includes a third switch coupled between the second node and the ground node; the third switch configured to selectively:
be in the open state during the first time interval and the second time interval to disconnect the second node from the ground node; and
be in the closed state during the third time interval to connect the second node to the ground node.

12. The apparatus of claim 1, wherein:
the control circuitry is configured to generate a mode signal that controls operational states of the first switch, the second switch, and the cross-regulation switch.

13. The apparatus of claim 1, wherein:
the single-inductor multiple-output power converter is configured to provide, during a first time interval, at least two output voltages at the at least two output nodes, respectively; and
the control circuitry is configured to:
cause the first switch to be in the open state and both the second switch and the cross-regulation switch are configured to be in the closed state during a second time interval that occurs after the first time interval; and
cause the first switch to be in the closed state, the second switch to be in the open state, and the cross-regulation switch to be in the open state during the first time interval.

14. The apparatus of claim 13, wherein:
the operational states of the first switch, the second switch, and the cross regulation switch during the second time interval represent a second switch configuration; and
the control circuitry is configured to adjust a magnitude of an inductor current that flows through the inductor based on an average time that the second switch configuration occurs.

15. An apparatus with a single-inductor multiple-output power converter, comprising:
a power source;
at least two loads; and
the single-inductor multiple-output power converter including:
an input node coupled to the power source;
at least two output nodes respectively coupled to the at least two loads;
an inductor coupled between the input node and the at least two output nodes;
power-delivery means for selectively charging and discharging the inductor to transfer power from the power source to one of the at least two loads and discharging the inductor to transfer energy from the inductor to the power source, the power-delivery means coupled to the input node, the inductor, and the at least two output nodes; and
control means for causing the power-delivery means to discharge the inductor to transfer the energy from the inductor to the power source responsive to at least one output voltage at the at least two output nodes being greater than a reference voltage, the control means coupled to the power-delivery means.

16. The apparatus of claim 15, wherein:
the single-inductor multiple-output power converter includes a first node, a second node, and a ground node;
the inductor is coupled between the first node and the second node;
the power-delivery means is configured to transfer the power from the power source to one of the at least two loads during a first time interval and discharge the inductor to transfer the energy from the inductor to the power source during a second time interval; and
the power-delivery means comprises:
first switching means for connecting the input node to the first node during at least a portion of the first time interval and disconnecting the input node from the first node during the second time interval, the first switching means coupled between the input node and the first node;
second switching means for connecting the first node to the ground node during the second time interval, the second switching means coupled between the first node and the ground node; and
cross-regulation means for disconnecting the input node from the second node during the first time interval and connecting the input node to the second node during the second time interval.

17. The apparatus of claim 16, wherein the second switching means is configured to:

connect the first node to the ground node during a portion of the first time interval; or disconnect the first node from the ground node during the first time interval.

18. A method of operating a single-inductor multiple-output power converter, the single-input multiple-output power converter comprising an input node, a first node, a second node, a ground node, an inductor coupled between the first node and the second node, and at least two output nodes coupled to the second node, the method comprising:

detecting that at least one output voltage at the at least two output nodes is greater than a reference voltage; and responsive to the at least one output voltage being greater than the reference voltage:

disconnecting the input node of the single-inductor multiple-output power converter from the first node of the single-inductor multiple-output power converter;

connecting the first node to the ground node; and connecting the input node to the second node to transfer energy from the inductor to a power source coupled to the input node.

19. The method of claim 18, further comprising:

connecting the input node to the first node during a first time interval;

disconnecting the first node from the ground node during the first time interval; and disconnecting the input node from the second node during the first time interval, wherein the connecting of the first node to the ground node and the connecting of the input node to the second node occurs during a second time interval, the second time interval occurring after the first time interval.

20. The method of claim 19, further comprising:

disconnecting the second node from an output node of the single-inductor multiple-output power converter during the second time interval; and connecting the second node to the output node during the first time interval, wherein the connecting of the input node to the first node, the disconnecting of the first node from the ground node, the disconnecting of the input node from the second node, and the connecting of the second node to the output node jointly comprise charging the inductor to transfer power from the power source to a load, the power source coupled to the input node, the load coupled to the output node.

21. The method of claim 19, further comprising:

connecting the second node to the ground node during the first time interval, wherein the connecting of the input node to the first node, the disconnecting of the first node from the ground node, the disconnecting of the input node from the second node, and the connecting of the second node to the ground node jointly comprise charging the inductor.

22. An apparatus with a single-inductor multiple-output power converter, comprising:

a power source;

at least two loads; and the single-inductor multiple-output power converter including:

an input node coupled to the power source;

at least two output nodes respectively coupled to the at least two loads;

an inductor coupled between the input node and the at least two output nodes;

a node disposed between the inductor and the at least two output nodes; and a cross-regulation switch coupled between the input node and the node, the single-inductor multiple-output power converter configured to discharge the inductor to transfer energy from the inductor to the power source via the cross-regulation switch responsive to at least one output voltage at the at least two output nodes being greater than a reference voltage.

23. The apparatus of claim 22, further comprising:

control circuitry coupled to the single-inductor multiple-output power converter, the control circuitry configured to:

monitor the at least one output voltage;

determine that the at least one output voltage is greater than the reference voltage; and cause the single-inductor multiple-output power converter to discharge the inductor responsive to the determination.

24. The apparatus of claim 23, wherein the control circuitry includes:

a current sensor coupled to the inductor;

an averaging circuit coupled to the cross-regulation switch;

an error comparator circuit coupled to the current sensor, the averaging circuit, and the at least two output nodes; and at least two comparator circuits respectively coupled to the at least two output nodes.

25. The apparatus of claim 22, wherein the single-inductor multiple-output power converter is configured to:

charge and discharge the inductor to transfer power from the power source to one of the at least two loads during a first time interval; and discharge the inductor to transfer energy from the inductor to the power source during a second time interval.

26. The apparatus of claim 25, wherein the single-inductor multiple-output power converter is configured to operate as a buck power converter during the first time interval.

27. The apparatus of claim 25, wherein the single-inductor multiple-output power converter is configured to operate as a boost power converter during the first time interval.

28. The apparatus of claim 25, wherein the single-inductor multiple-output power converter is configured to operate as a buck-boost power converter during the first time interval.

29. The apparatus of claim 22, wherein the single-inductor multiple-output power converter is further configured to discharge the inductor to transfer energy from the inductor to the power source via the cross-regulation switch responsive to a change in one or more load currents at the at least two output nodes.

30. The apparatus of claim 22, wherein the single-inductor multiple-output power converter is further configured to discharge the inductor to transfer energy from the inductor to the power source via the cross-regulation switch responsive to a change in one or more reference voltages associated with the at least two loads.

* * * * *